INVENTORS.
WALLACE H. HOLSTE
LLOYD B. WESTON
BY Morton S. Adler
ATTORNEY.

METHOD AND APPARATUS FOR PROCESSING GRAIN

Filed May 16, 1967

INVENTORS.
WALLACE H. HOLSTE
LLOYD B. WESTON

BY Morton L. Adler

ATTORNEY.

INVENTORS.
WALLACE H. HOLSTE
LLOYD B. WESTON
BY Morton S. Adler
ATTORNEY.

INVENTORS.
WALLACE H. HOLSTE
LLOYD B. WESTON
BY Morton S. Adler
ATTORNEY.

METHOD AND APPARATUS FOR PROCESSING GRAIN

INVENTORS.
WALLACE H. HOLSTE
LLOYD B. WESTON
BY Morton S. Adler
ATTORNEY.

INVENTORS.
WALLACE H. HOLSTE
LLOYD B. WESTON
BY Morton S. Adler
ATTORNEY

INVENTORS.
WALLACE H. HOLSTE
LLOYD B. WESTON
BY Morton S. Adler
ATTORNEY.

INVENTORS.
WALLACE H. HOLSTE
LLOYD B. WESTON
BY Morton S. Adler
ATTORNEY.

INVENTORS.
WALLACE H. HOLSTE
LLOYD B. WESTON
BY [signature]
ATTORNEY.

INVENTORS.
WALLACE H. HOLSTE
LLOYD B. WESTON
BY Morton S. Adler
ATTORNEY

United States Patent Office 3,453,990
Patented July 8, 1969

3,453,990

METHOD AND APPARATUS FOR PROCESSING GRAIN

Wallace H. Holste, Rte. 1, Box 13, Massena, Iowa 50853, and Lloyd B. Weston, Atlantic Hotel, Atlantic, Iowa 50022

Continuation-in-part of application Ser. No. 397,923, Sept. 21, 1964. This application May 16, 1967, Ser. No. 638,951
Int. Cl. A01k 5/00
U.S. Cl. 119—51.5 23 Claims

ABSTRACT OF THE DISCLOSURE

Apparatus and method for inducing the sprouting of grain by moving the grain through a processing area where temperatures, both high and low, and moisture content are controlled. Water sprays at controlled temperatures are applied to the grain with all water coming from a central reservoir. Sprayed water is returned to the supply in the central reservoir after permeating the grain where it is admixed and agitated and reused for further spraying.

CROSS-REFERENCE TO RELATED APPLICATION

This application is a continuation-in-part of our copending application under the same title, Ser. No. 397,923, filed Sept. 21, 1964 now Patent No. 3,339,529.

BACKGROUND OF THE INVENTION

*Field of the invention*

This invention relates to an improved method and apparatus for inducing the sprouting of grain.

*Description of the prior art*

The sprouting or germinating of grain by controlled conditions of moisture and temperature generally is, of course, well known but the complexity and cost of accomplishing this has heretofore made it economically unfeasible to carry this out on any wide scale commercial program. Illustrations relating to this field may be found in the patents to Frauenheim, Jr., No. 2,654,691, and Stoddart, No. 2,998,351, and more recently, the patent to Venca, No. 3,233,590, discloses a somewhat less complex means than earlier devices.

The present invention differs materially from any of the above patents and other known apparatus having a similar purpose in that it employs a unique and novel system for recirculating and reusing the water that is used to regulate the moisture and temperature of the grain being processed and also utilizes means to keep the grain from overheating.

SUMMARY

The present invention is directed to a novel concept in germinating grain which includes the use of a central water supply reservoir from which water is drawn for use in controlling the temperature, both high and low, and the moisture of the grain as it moves through a processing area and whereby such water, after it has permeated the grain, is returned to said reservoir where it is admixed and agitated with the supply therein and is further used on the grain as water is drawn from the reservoir. The sprouted grain resulting and the contents of the reservoir are exceedingly high in nutritional value and can be used or processed into food for both animals and humans.

It has long been known and recognized by those concerned with nutritional research that sprouted grains or seeds have substantially more nutritional value than unsprouted grains or seeds. While no attempt will be made here to define just what chemical actions and reactions take place in the sprouting of grain to produce these added nutritional values, it is recognized that vitamin and protein content of sprouted grains and seeds is considerably increased over that of their unsprouted state. For example, nutritional research indicates that 100 grams of whole dry oats contains 11 mg. of vitamin C before sprouting and 20 mg. after germinating for 96 hours. This is increased to 42 mg. at 120 hours. Dry peas contain zero mgs. of vitamin C before germinating and 86 mg. after 96 hours of germination. Other vitamins have similar characteristics of which the following examples are illustrative: thiamin (AB) increases from 7 parts to 9 parts in wheat; riboflavin (B′) increases 4 parts; niacin, pantothenic acid, pyridoxine and biotin ($B^2$) doubled; and $B^4$ wheat seed increased from 28 parts to 106 parts. Other vitamins show similar increases.

The use of sprouted grain for both animal and human consumption has been attempted on a very limited scale both in this and foreign countries and while the results from a nutritional standpoint are exceedingly favorable, the high cost of adequate methods and equipment for producing sprouted grain has made it impractical to economically employ such processes to any wide extent. Consequently, in view of such high costs, present commercial feeding practices in relation to animals, for example, utilize only the unsprouted grain and seeds which do not remain in the digestive system long enough to develop and release all of the nutritional elements which are potentially present, and, as a result, the feeding period for developing desirable weights and meat quality in cattle, for example, may run from 9 to 12 months with relative high feed costs per pound of gain. However, it will be appreciated that while an extended period of feeding unsprouted grain may eventually bring weights up to specified limits, still the full nutritional potential of the grain is never developed under present feeding methods because the grain is consumed in unsprouted form.

With the above observations in mind, extensive tests have been conducted in the feeding of sprouted grain to cattle and hogs, for example, with no protein concentrates, antibiotics or other additives being used. The animals used in such tests maintained an excellent state of health during the tests and the production of red, rich muscle protein and adequate, but not excess, fat was produced in approximately one third the time usually required under present feeding practices and at considerably less cost per pound of gain since the superior nutritional value of the sprouted grain required a lesser amount of feed consumption to reach a given weight limit than in the case of unsprouted grain feed. Such tests also determined that a prime grade of meat could be produced at lesser total weight than heretofore was considered possible. In relation to hogs, such tests showed that the carcass weight produced over 30% less lard than with hogs on unsprouted grain feed which means more lean meat and less lard. Other results noted include the facts that manure from animals fed on sprouted grain had no objectionable odor; that such animals were more quiet and gentle and appeared to be bothered little, if at all, from flies and insects.

The above noted tests merely confirmed the fact that results from a feeding program utilizing sprouted grain are far superior to any results obtainable under present feeding programs and accordingly, one of the important objects contemplated herein is the provision of an economical and commercially practicable method of inducing the sprouting of grain for use in an animal feeding program, together with novel apparatus for use therewith.

Another object inhering in this invention is to provide for the sprouting of grain for feed purposes which can be consumed at the point of processing or which can be delivered to a point of deposit for removal to a remote location for consumption or other uses.

Still another object herein is to provide an economical means for sprouting grain whereby the grain and the contents of the reservoir can be utilized in the preparation of an edible human product.

More particularly, it is an object here to move unsprouted grain from a point of storage to a point of use and during such movement to not only saturate such grain with water from a controlled reservoir supply at a controlled temperature but to continually re-saturate such grain with the same water so that nutritional elements in the water are not lost.

A further object in relation to an animal feeding program is to utilize the water referred to above as a source of drinking water for the animals being fed so that they will obtain all nutritional benefits therefrom.

Still another object herein is the provision of a controlled recirculated water supply which, in the animal feed program, utilizes the water in which saliva drippings from the animals fall for circulation through the grain during processing.

Yet another object is to provide for the water saturation of grain as above indicated either on a predetermined timed cycle basis or in response to thermal and moisture sensing means set to predetermined requirements.

A further object herein is the provision of an animal feeder that can be adapted easily for use by cattle or hogs and which may also be adapted if desired for feeding poultry.

Still another object herein is to provide control means for cooling the grain during processing if the temperature thereof should rise above a predetermined limit.

The objects of this invention together with the advantages of the same as outlined will be more fully described and developed in relation to the more detailed description of the accompanying drawings.

*Description of preferred embodiments*

Figures 1, 2:
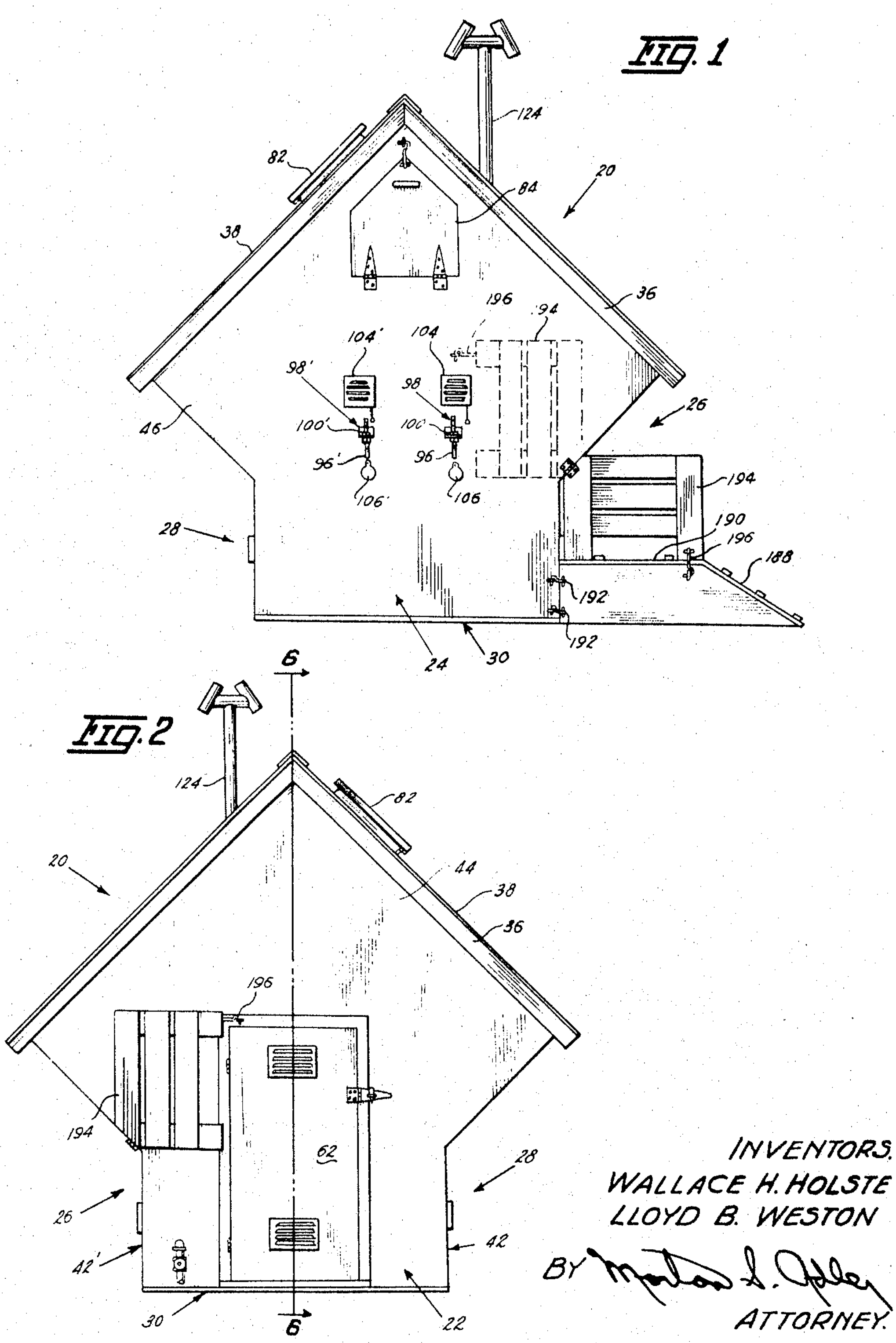
FIG. 1 is an elevational rear end view of an animal feeder unit with this invention.
FIG. 2 is an elevational front end view thereof.

Referring to the drawings, and more particularly at this time to FIGS. 1–7 inclusive, an animal feeder is designated generally by the numeral 20 and is shown to illustrate that form of this invention where grain is processed from its unsprouted to sprouted state for consumption by the animals, such as cattle and hogs, for example, at the site of the feeder. The more or less house or hut-like appearance of feeder 20 is basically of a design that is not uncommon and while no invention is claimed in certain of the structural features per se, we have adapted many changes and improvements as will become apparent and be pointed out as this description proceeds.

Feeder 20 for purposes of reference includes a front end 22 (FIG. 2), a rear end 24 (FIG. 1) and the respective opposed sides or side areas 26 and 28. Side areas 26 and 28, as will become apparent, are similarly constructed so as to utilize feeder 20 for feeding purposes at two places and in this ragard, the grain processing apparatus is merely duplicated for each side. It will thus be appreciated that a detailed description of this invention in relation to only one feeding side will suffice for both sides and thus in the following description aside from the general basic construction of feeder 20, reference is made to side 26 and corresponding parts for side 28 will be given like numerals primed.

Figures 3, 4:
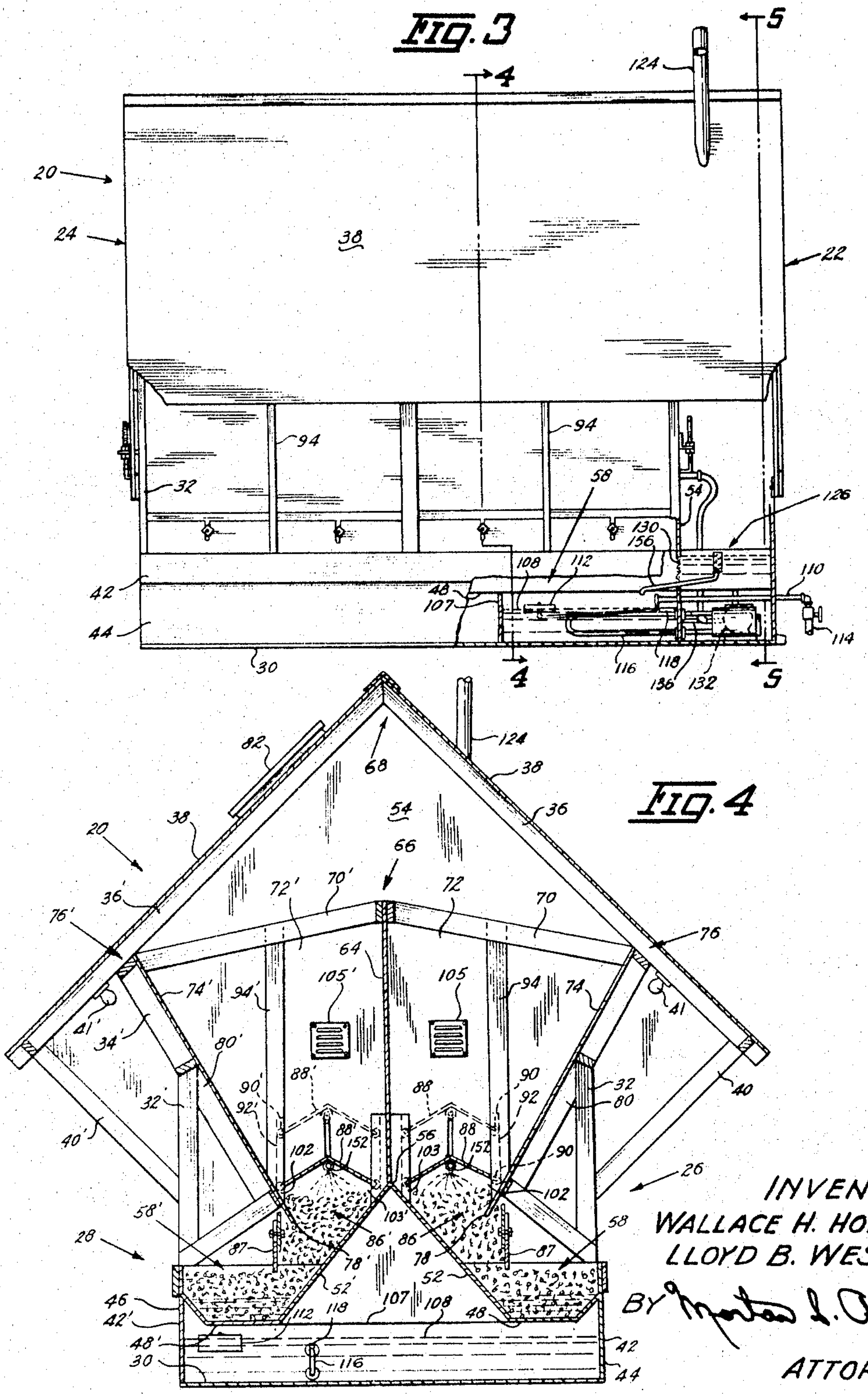
FIG. 3 is a side view of this feeder having portions cut away at the lower front end to illustrate certain features of the water reservoir and pumping equipment.
FIG. 4 is a cross sectional view taken on the line 4—4 of FIG. 3.
Figure 5:
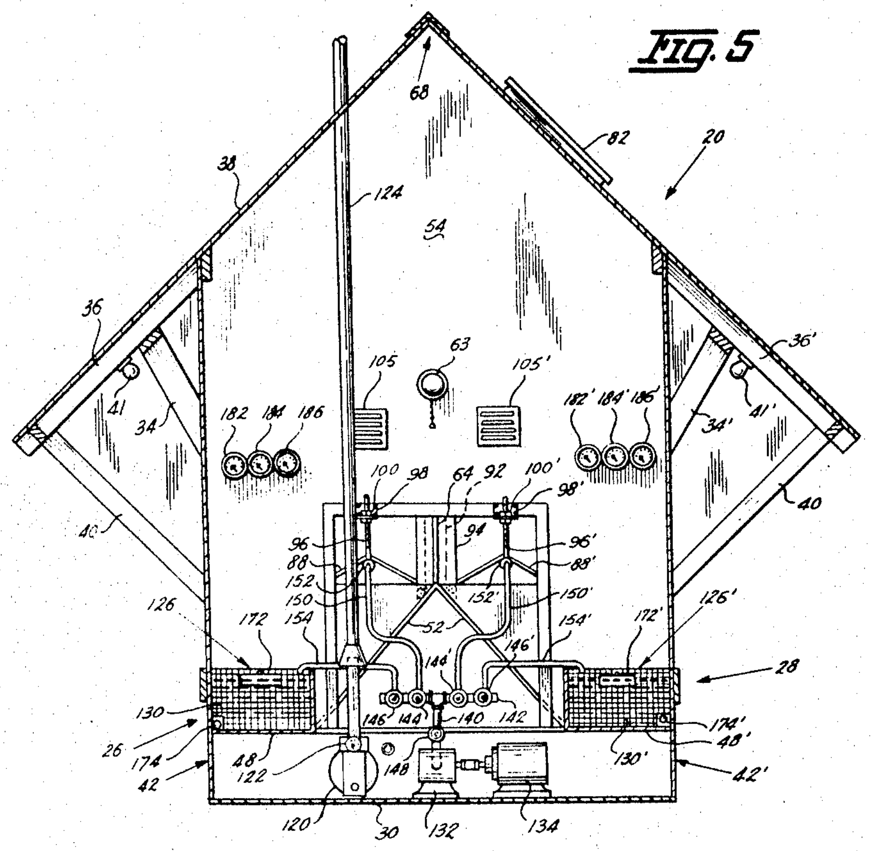
FIG. 5 is a cross sectional view taken on the line 5—5 of FIG. 3.
Figure 7:
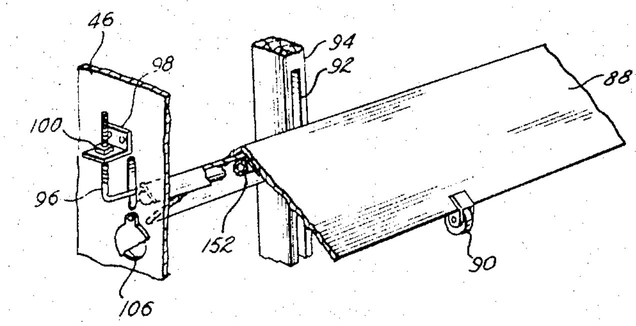
FIG. 7 is an enlarged fragmentary perspective view of the vertically adjustable inverted V board for regulating the flow of grain.

Feeder 20 includes a base floor or platform 30 which carries suitable corner posts 32 that in turn support studding 34 to which there are attached the rafters 36 of the gabled roof 38. The side edges of roof 38 overhangs the side areas 26 and 28 to provide weather protection as will appear and additional studding 40 to such overhanging portions may be provided in any well known form as best seen in FIG. 4. Lights 41 may also be provided under the overhang of roof 40 (FIG. 4) for obvious reasons. The sides 26 and 28 are enclosed by the relatively low upstanding walls 42, 42′ and ends 22 and 24 are likewise enclosed by siding or the like 44 and 46 (FIGS. 1 and 2). Spaced above base 30 and parallel thereto but below the top plane of walls 42, 42′ is the floor 48, 48′ which provides an equipment chamber or compartment 50 below. Floor sections 48, 48′ are separated by an inverted V-shaped deflector member 52 which extends between the rear end 24 and a partition wall 54 near front end 22 and which has its apex point or ridge 56 somewhat higher than the top of walls 42, 42′. Wall 54 together with side wall 42, 42′, floor 48, 48′, and the rear wall 46 thus provides the feeding troughs 58, 58′ and further defines the forward compartment or vestibule 60 (FIG. 6) to which access is provided by the door 62 (FIG. 2) and which may be lighted as at 62 (FIG. 5).

The interior of feeder 20 is divided longitudinally by a partition 64 supported on the ridge 56 of deflector 52 (FIG. 4) and extends upwardly to point 66 that is preferably spaced below the apex 68 of roof 38. End portions of partition 64 are braced by the beams 70, 70′ connected to the respective posts 34 and such partition thus provide two grain storage compartments or hoppers 72, 72′ which are completed by the sides 74, 74′ that extend from the rafter 36 at point 76, 76′ downwardly and inwardly to point 78, 78' which is below the plane of ridge 56 but spaced above the top of sides 42, 42' that define the top of the feed troughs 58, 58'. Inclined posts or studs 80, 80'' may also be used for support of walls 74, 74' as best seen in FIG. 4.

A door or hatch 82 is provided in roof 38 for grain access and a second door 84 (FIG. 1) is provided in the upper portion of the rear wall 46 in a well known manner. The construction of feeder 20 so far described, with the exception of the vestibule 60 and compartment 50 is generally one of a well known design adapted to provide a grain storage bin or hopper for gravity flow through the restricted passageways 86, 86' between the bottoms 78, 78' of walls 74, 74' and the sloping side of the deflector board 52 that directs the grain to the respective feed troughs 58, 58'. Between passageways 86, 86' vertically adjustable barriers 87, 87' may also be provided in a well known manner to limit the flow of grain from the processing area into the feed troughs 58, 58'.

It will be appreciated so far that hoppers 72, 72' and their related troughs 58, 58' are merely duplicate constructions which obviously permit the feeding of more animals than a single trough, or the feeding of different feeds and since the processing apparatus to be described is also merely duplicated for each hopper, further description will be directed to bin or hopper 72 and like numerals for like parts in hopper 72' will be primed in the drawings only except where specific reference to the primed part seems expedient.

A means for regulating the flow of grain through passageway 86 is provided by means of the inverted V board or deflector 88 which is vertically movable in the lower portion of hopper 72. Opposed edges at each end of deflector 88 carry rollers 90 (FIG. 7) which ride in grooves 92 formed in opposed vertically arranged posts 94. A control rod 96 secured to each apex end of deflector 88 extends through the rear wall 46 and partition 54 where its free end is bent upwardly and threaded for vertical adjustment in a bracket 98 with a nut 100. By this arrangement, further restricted grain passageways 102 and 103 are provided between the respective edges of the V board 88 and the hopper walls defined by wall 74 and deflector side 52 to control the amount of grain moving toward passageway 86. Consequently, as V board 88 is raised or lowered, the size of passageways 102 and 103 are increased and decreased accordingly and in addition to this function, board 88 serves to effectively partition hopper 72 so that that portion of the hopper above board 88 is a storage area or reserve chamber and that portion below board 88 between passageways 102 and 103 and 86 is what we shall refer to as the processing area or chamber for reasons that will become apparent as this description proceeds. Means are provided to ventilate each processing area if desired or necessary and this includes an exhaust fan 104 in the rear wall 46 at the level of the processing area and an oppositely disposed louvre or screened opening 105 in the partition wall 54. A closable peep hole 106 is also provided in the rear wall 46 for visual observation of the processing area described.

A water tank or reservoir 107 which serves as the central source of water supply in the grain sprouting process to be hereinafter described is located in compartment 50 in any suitable place but preferably near vestibule 60 for easy access to the parts thereof and in the case of double feeding areas such as troughs 58, 58', it is convenient to locate tank 107 approximately below partition 64. The size of tank 107 will, of course, vary with the size of feeder 20 and the number of animals to be fed, or in the case where there is no feeding at the site, as will later appear, in accordance with the amount of grain to be processed within given time periods. Water 108 is delivered to tank 107 by a supply line 110 which will connect to any suitable source of supply under ordinary main pressure and a desired water level is maintained in tank 107 by a float valve 112. A manual valve 114 may also be placed in line 110 if desired as seen in FIG. 3. Water 108 is preferably maintained at 75° F. by any suitable type of heating element 116 that is responsive to a thermal element 118. We have used a gas heating unit 120 with a control knob 122 for element 118 but any other form of heater may be employed. Heater 120 is provided with the usual vent stack 124 that extends upwardly in vestibule 60 through the roof 38. The temperature of water 108 may be permitted to vary from 75° F. but it is pointed out that the possibilities for undesirable results are substantially increased if such temperature exceeds 120° F. or fall below 37° F.

Figure 6:
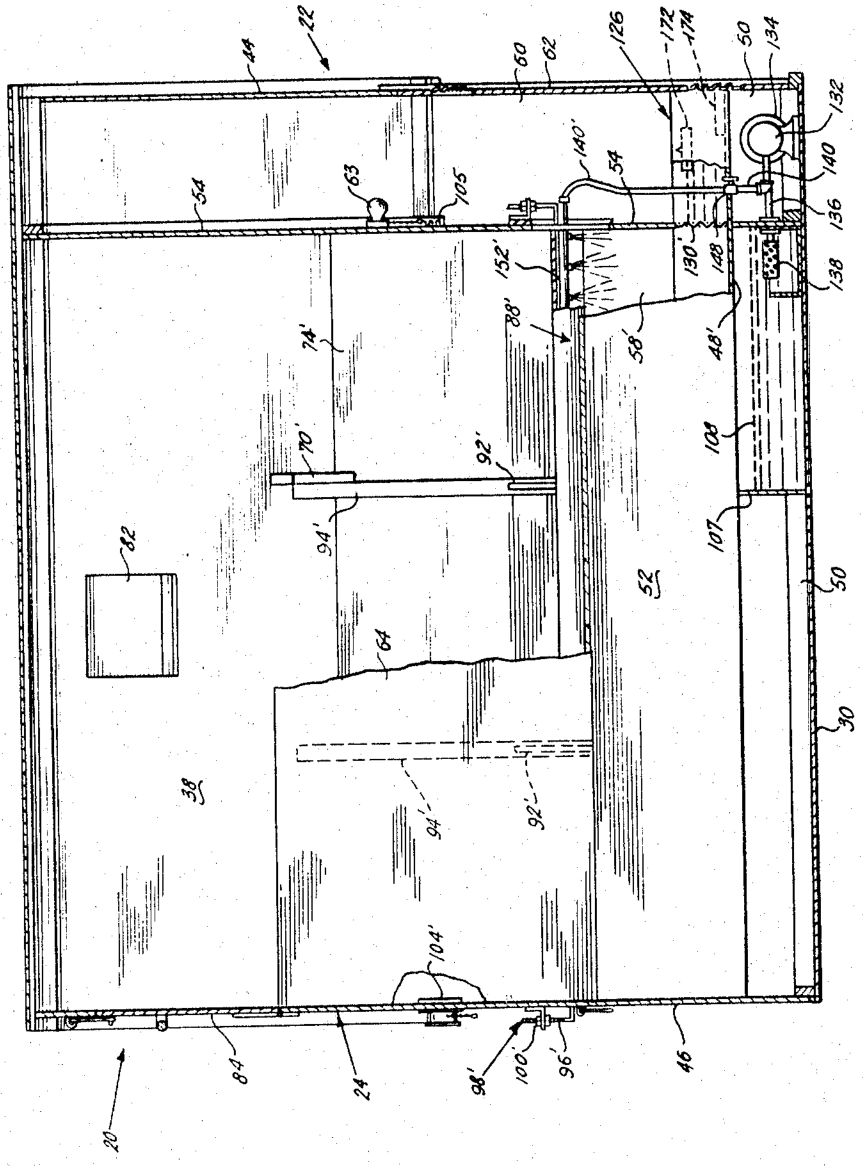
FIG. 6 is a longitudinal sectional view taken on the line 6—6 of FIG. 2 and further having portions cut away to more fully illustrate certain of the construction.

Water 108 under certain temperature and moisture control means is used to moisten feed or grain moving through the processing area below the V board 88 and is also used for drinking water for the animals and for this purpose a water pumping and distributing system is used as will be described with reference being made more particularly to FIGS. 3, 5, 6 and 17. It should first be mentioned that while partition 54 defines the front end of the feeding trough 58, the trough structure actually extends forwardly thereof so that partition 54 also in effect divides the trough into the feed retaining portion 58 previously described and a drinking compartment 126 adjacent the forward end 22 of house 20. Trough 58 and compartment 126 are connected for water flow communication in any suitable manner that will keep feed 128 in the trough 58 and this may be by means of a screened opening 130 (FIG. 6).

Figure 17:
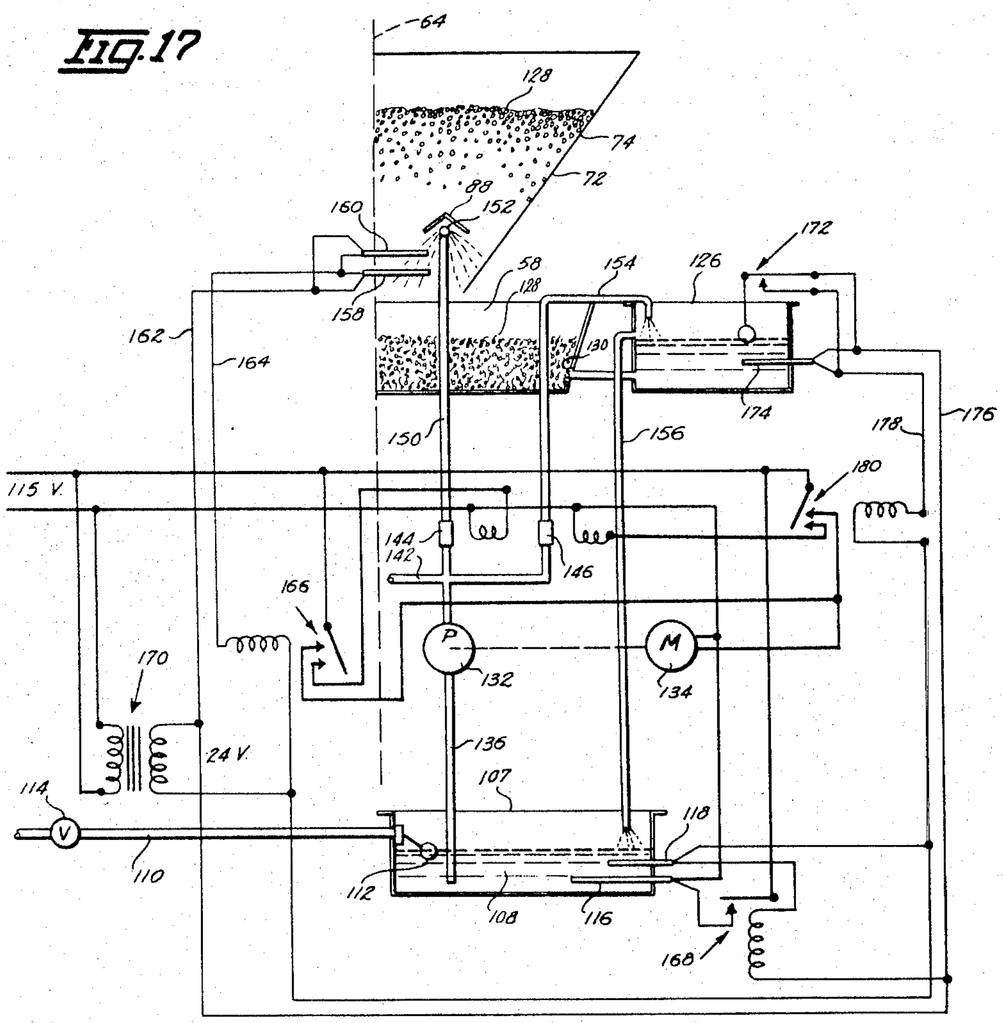
FIG. 17 is a schematic drawing illustrating the circuitry and related apparatus used with this invention.
Figure 18:
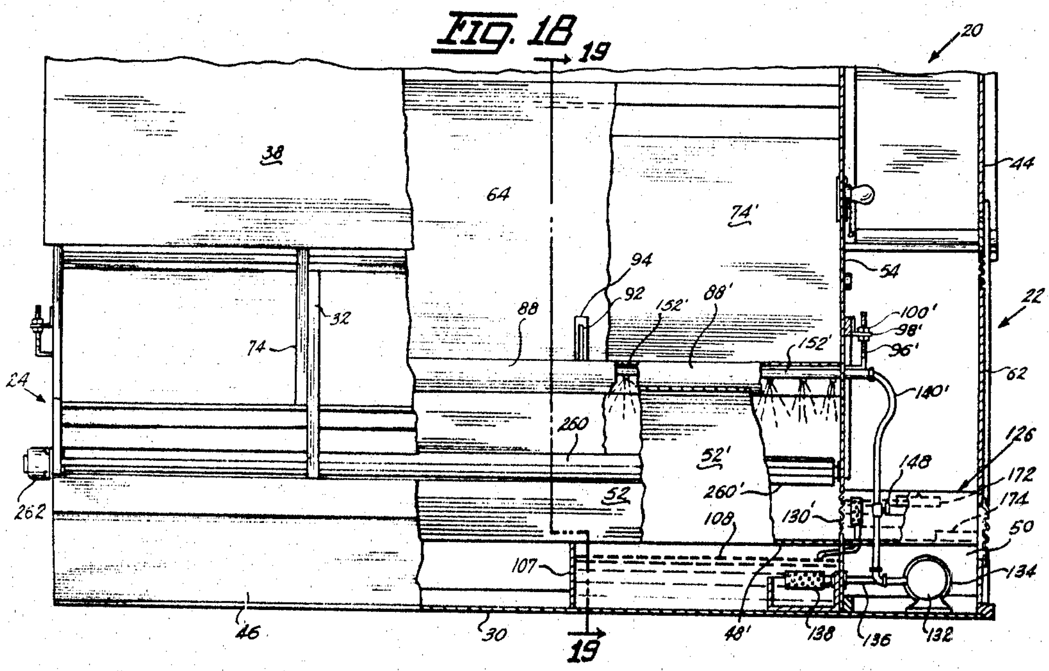
FIG. 18 is a side view, partly in section, similar to FIG. 6 but showing a modified control means for moving feed from the hopper area to the feed trough.

For purpose of our water control system, a pump 132 operated by an electric motor 134 is mounted on floor 30 within compartment 50 (FIGS. 5 and 6) with pump 132 connected to tank 107 by pipe 136 and arranged so that water 108 drawn from tank 107 passes through a filter unit 138 which is located in tank 107 near the surface level of the water 108 as best seen in FIG. 18 whereby the water to be circulated through the processing area is drawn from the top of the water supply which is warmer than the lower portion sometimes as much as fifteen degrees more or less. This is preferably done because the warmer water is more conducive than the colder area for suitably maintaining whatever elements may be in the water for their value for nutritional purposes or otherwise. From tank 107, water 108, when pump 132 is actuated as will later be referred to, flows through pipe 140 to a manifold 142 having a pair of outlets each normally closed by the respective solenoid operated valves 144 and 146. A water pressure release valve 148 is imposed in line 140 between pump 132 and the manifold 142 for obvious reasons. Valve 144 is connected by a flexible flow line 150 to a sprinkle pipe 152 that is secured to the underside of the apex of V board 88 as best seen in FIGS. 4 and 6 and the flexibility of line 150 permits it to be moved with any vertical adjustment of board 88 that may be desired. Valve 146 connects to a filler pipe 154 that is arranged to supply water 108 direct from tank 107 to the drinking compartment 126. A filtered overflow pipe 156 extends from compartment 126 to tank 107 (FIG. 17).

Certain controls for the water system so far described are provided and these will be described in reference more particularly to FIGS. 5 and 17. For purpose of supplying the heated water 108 to grain 128 in the processing area, a temperature sensitive probe 158 and a moisture sensitive probe 160 are suitably suspended in the processing area and are connected in parallel through leads 162 and 164 so that when either probe responds to the limits of temperature or moisture as predetermined, valve 144 will be opened by the closing of switch 166 and pump 132 will be actuated to supply water to the sprinkle pipe 152 by the closing of switch 168. In this regard (FIG. 17) it will be noted that pump 132 and motor 134 operate on 115V for which the circuit is shown in heavy lines, and probes 158 and 160, by means of a transformer 170, operate on 24 v. for which the circuit is shown in light lines. With reference to the temperature probe 158, it is pointed out that the predetermined temperature limits are preferably so designed so that in the event the grain becomes too warm in the processing area, water is supplied through pipe 152 to provide a cooling of the grain and thus it will be seen that water is supplied both for required moisture or for cooling under the conditions indicated.

In the drinking compartment 126 a float actuated switch 172 and a temperature sensitive probe 174 are connected in parallel through leads 176 and 178 so that when either one responds to its prefixed requirements, valve 146 is opened by the closing of switch 180 and pump 132 is actuated to supply water to the fill pipe 154 by the closing of switch 168. Control dials 182, 184 and 186 are operatively connected to the respective sensing elements 158, 160 and 174 and are mounted to partition 54 within the vestibule 60 as seen in FIG. 5.

OPERATION

With the grain processing and feeder device constructed as described, it will operate in the following manner. Grain 128 to be processed from an unsprouted to sprouted state is supplied to the storage area or chamber within hopper 72 and the V board 88 is adjusted so that passageways 102 and 103 permit the grain to pass from the storage area to the processing area at the desired rate. It will be understood that water 108 is maintained automatically by float valve 112 at a desired level in tank 107 and is also automatically maintained at preferably 75° F. by the thermostatically controlled heater 120. Board 88 by being inverted not only provides an air space for ventilation by fan 104 within the processing chamber, but also protects the grain in the storage area from spray from pipe 152.

The grain or feed 128 is induced to sprout or germinate under proper conditions of moisture and temperature as is well known and water 108 from tank 107 is sprayed over the grain in the processing area either in response to moisture or temperature requirements as called for by probes 158 and 160 from time to time. If the grain temperature goes below set limits, it will be raised by sprays of the heated water in tank 107. However, such water temperature is lower than the high temperature limits, so if such high limits are exceeded, sprays from water in tank 107 will have the effect of lowering the grain temperature or cooling down to a desired range. The grain, in the device so far described, moves by gravity from the processing area into the feed trough 58 and initially this movement may be prevented by barrier 87 for a predetermined length of time while the grain is germinating. Such time interval can be determined by experience with different grains and once the sprouting process has commenced, barrier 87 can be opened to permit the regulated flow of grain to the feed trough 58.

As grain in the processing area is sprayed from time to time, the residue water filters into trough 58 with the grain and also accumulates in the drinking compartment 126 in which there is no feed because of screen 130. Thus, as the animals feed, they not only obtain water from trough 58 which is mixed with the feed, but they can also drink from compartment 126. As this occurs, their siliva drippings are co-mingled with the water in trough 58 and compartment 126 and this eventually finds its way back to tank 107 through the overflow pipe 156 where it becomes a part of the central water supply in tank 107 which is admixed therewith and generally agitated by the pressure of fresh water entering tank 107 through line 110 and is eventually sprayed on the grain in the processing area.

The level of water in compartment 126 is regulated by float valve 172 so that it is sufficiently below the bottom of barrier 87 (FIG. 4) to permit free movement of the grain through passageway 86 into trough 58 and to expose passageway 86 to the atmosphere for necessary aeration and when valve 172 calls for water, the same is pumped directly from tank 107 through pipe 14, it being understood that such water includes water that has passed through the grain and returned to tank 107 through pipe 156. Also in compartment 126 is the heat sensing element 174 that is preset to a temperature somewhat lower than that of the water in tank 107. However, compartment 126 is exposed to the atmosphere and it is desired that the trough and drinking water not be permitted to freeze and that it be kept at suitable drinking temperatures. Thus, element 174 will call for water at prefixed temperature and even though compartment 126 may have an adequate supply as far as valve 172 is concerned, warm water from tank 107 will be pumped through pipe 156 until the water is at a desired temperature and the overflow pipe 156 will return excess capacity to tank 107.

The trough 58 and drinking compartment 126 are at proper heights for use by cattle but for use by hogs, for example, we have provided a ramp 188 to a feeding platform 190 at the required height. This is a removable structure being attachable to house 20 by suitable catches 192, and gate members 194 for the respective ends of platform 190, when used, are hingedly attached to the house 20 (FIGS. 1 and 2). Such gates 194 are secured to platform 192 by a bolt means 196 when in use and such bolt is also used to hold the gate in folded position when not used as seen in FIG. 2.

In the operation of this device as described, it is pointed out that the time intervals for spraying the grain in the processing area may be regulated on a fixed interval basis by a time clock device as well as by temperature and moisture sensing means and as a matter of expediency, such control means is illustrated in certain modified structures as will later appear.

MODIFIED STRUCTURES

Because it is contemplated that grain sprouted by the process described above may be used for further processing into human foods or may be processed as animal feeds to be consumed at a remote location, we have shown certain modifications in apparatus to accommodate these different purposes. Consequently, where like parts are present, like numerals for such parts already described will be used.

Figures 8, 10, 15:
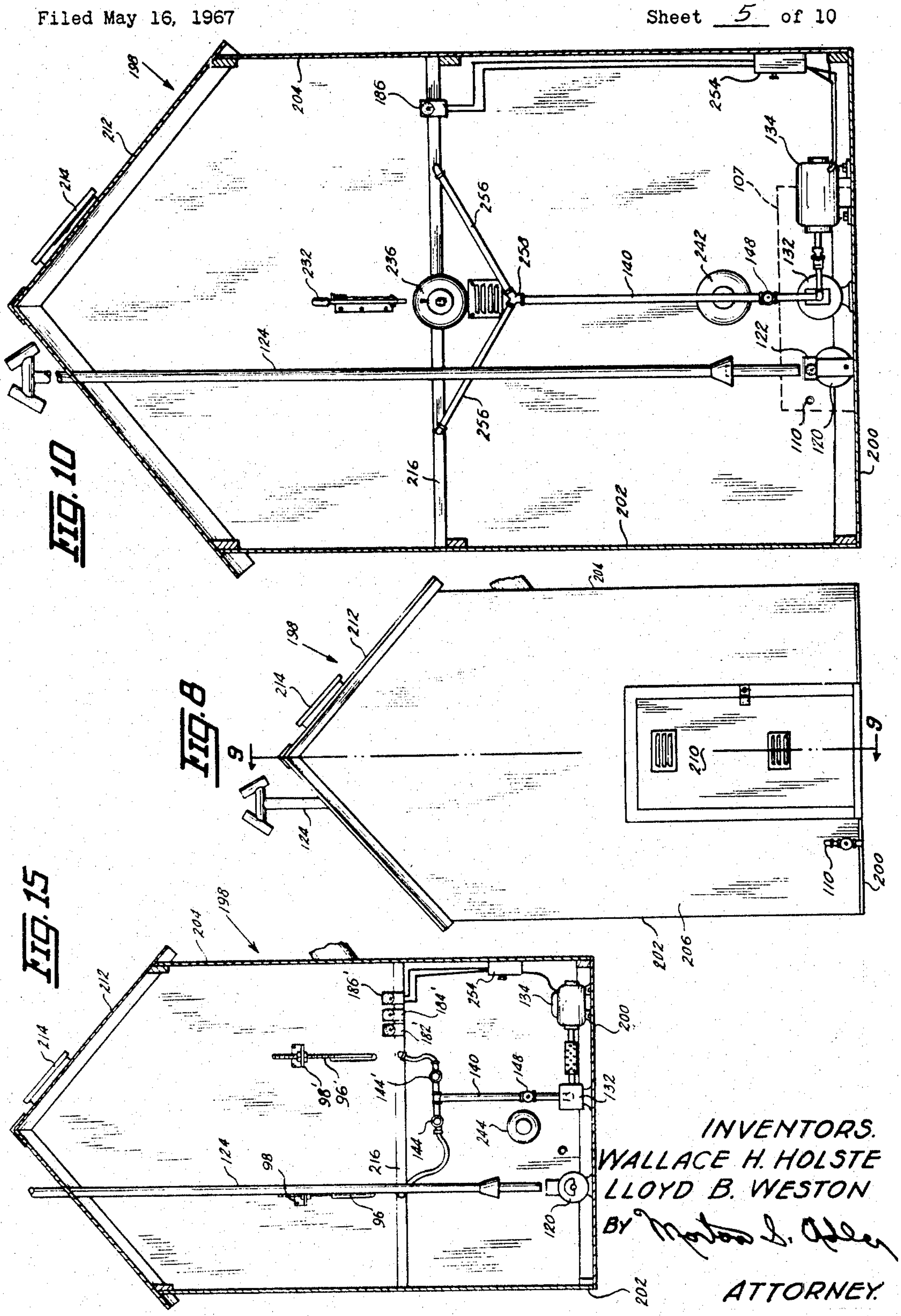
FIG. 8 is an elevational front end view of a grain processing unit which is modified from the device shown in FIGS. 1–7 to the extent that certain grain moving apparatus changes are included and the processed grain, as will appear, is intended to be removed to a remote location for consumption or other uses.
FIG. 10 is an enlarged front end view partly in section taken from the line 10—10 in FIG. 9 and illustrating the use of a timer for automatic periodic operation.
FIG. 15 is a front end view partly in section taken from the line 15—15 of FIG. 14.
Figures 11, 12, 13:
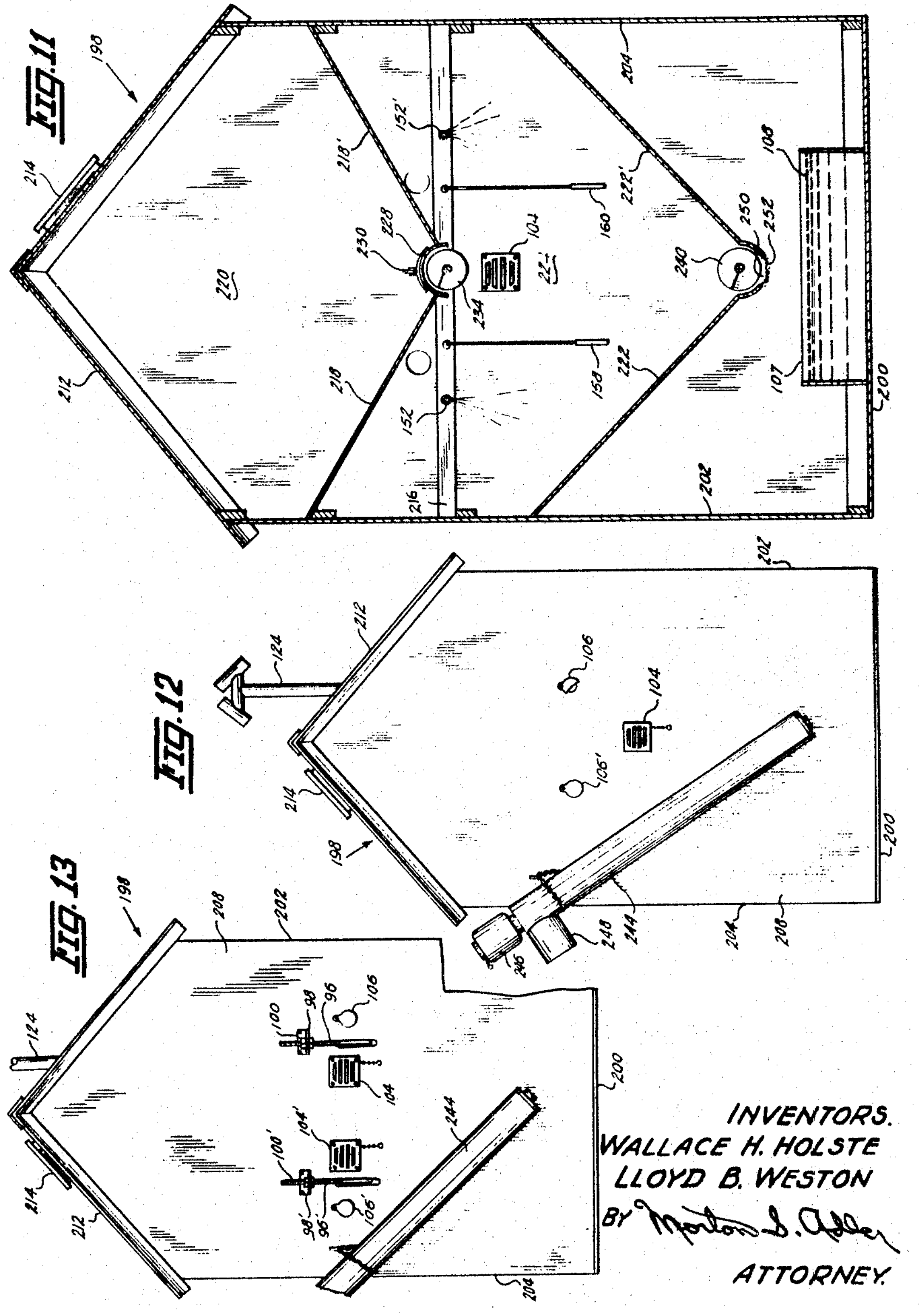
FIG. 11 is a cross sectional view taken on the line 11—11 of FIG. 9.
FIG. 12 is an elevational rear end view of the unit shown in FIG. 8.
FIG. 13 is an elevational rear end view of a grain processing unit similar to the structure in FIGS. 8–12 but including a further modification in certain of the grain moving apparatus.

The first modification is shown in FIGS. 8–12 where the grain processing unit is enclosed in any suitable structure such as the rectangular building or house 198 which includes the floor 200, sides 202, 204, front and rear walls 206 and 208, front door 210 and roof 212 in which there is the hatch 214. A partition wall 54 defines a vestibule 60 as previously described and elevated beams 216 at the front and rear extend between walls 202 and 204 as seen in FIGS. 10 and 11. Above beams 216, hopper-like sides 218 define the grain storage area 220 and below beams 216, other hopper-like sides 222 define the grain processing area 224. At the lower discharge end of the storage area 220 there is provided a plurality of longitudinally spaced grain discharge openings 226 (FIG. 9) closable by respective sliding gates 228 that are all connected to a movable rod 230 which is operable by a lever means 232 mounted to wall 54 within vestibule 60 whereby the size of openings 226 can be selectively varied. Immediately adjacent and below openings 226 is the auger-like slinger or diffuser 234 operated by the electric motor 236 having the manual switch 238. At the bottom of the processing area 224 a suitable conveying means here shown as an auger 240 is operated by motor 242 for moving the processed grain through the rear wall 208 to the directionally adjustable conveyor 244 operated by motor 246. Conveyor 244 includes a dispensing spout 248 in a well known manner. The water distributing system for the device shown in FIGS. 8–12 is similar to that previously described except that that portion of the system associated with the feed trough 58 and drinking compartment 126 has been eliminated. However, it will be noted in FIG. 9 that auger 240 slopes slightly downwardly from the rear to front of house 198 and near its forward or lower portion it is provided with an opening 250 covered by screen 252 so that residue water which has passed through the grain can drain into tank 107 for re-use.

In FIG. 11, the probes 158 and 160 are shown which function as described above and in FIG. 10, for illustration, a time clock device 254 is illustrated whereby the operation of pump 132 can be set on a time schedule if desired. It is also noted in the variation of FIGS. 8–12 and particularly FIG. 10 that the flexible water line 150 in FIG. 5 is replaced by rigid conduits 256 connected to a Y fitting 258 in line 140. The two lines 256 are used because two sprinkler pipes 152 are preferably employed with this modification.

Figure 9:
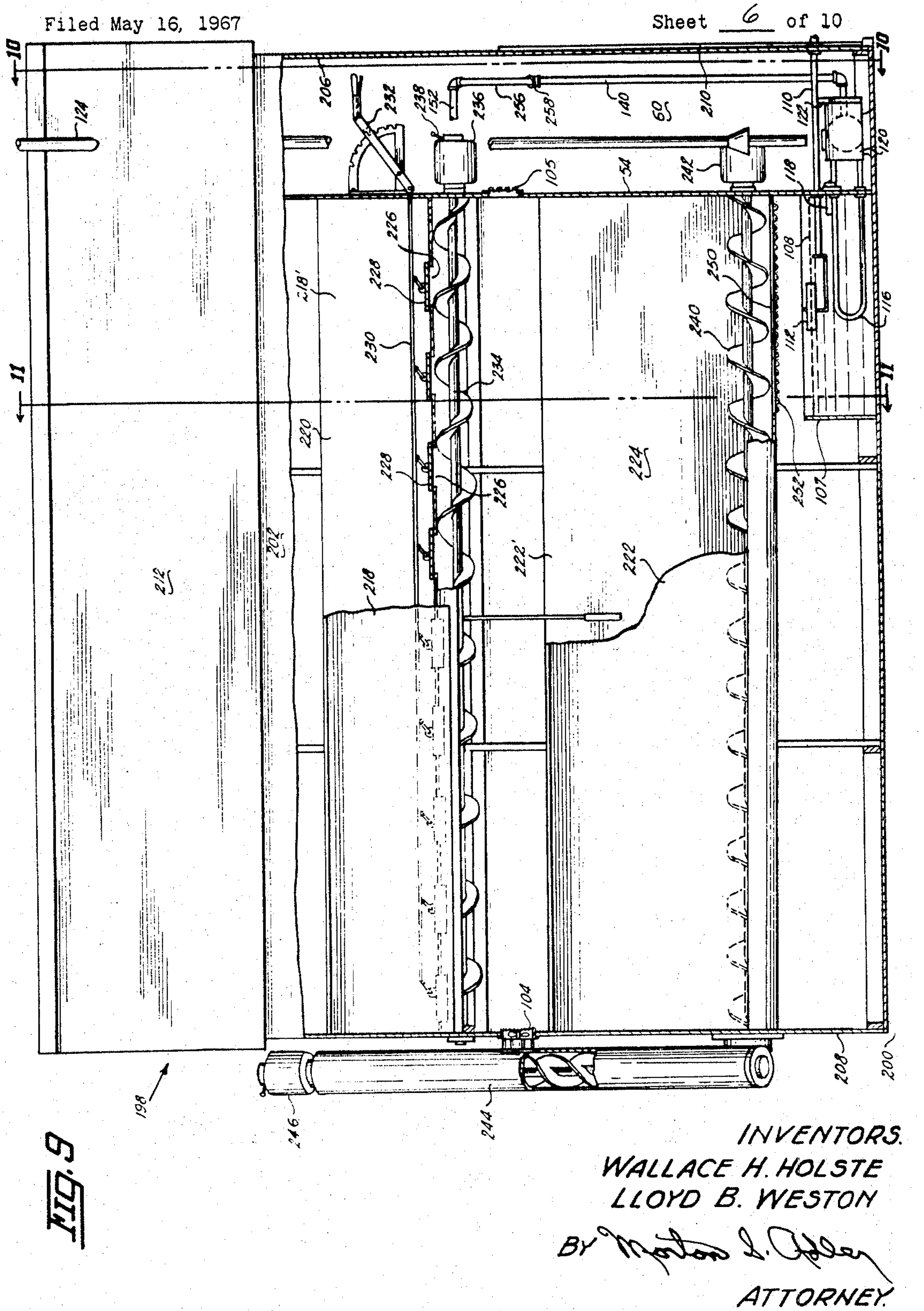
FIG. 9 is an enlarged longitudinal sectional view taken on the line 9—9 of FIG. 8.
Figures 14, 16:
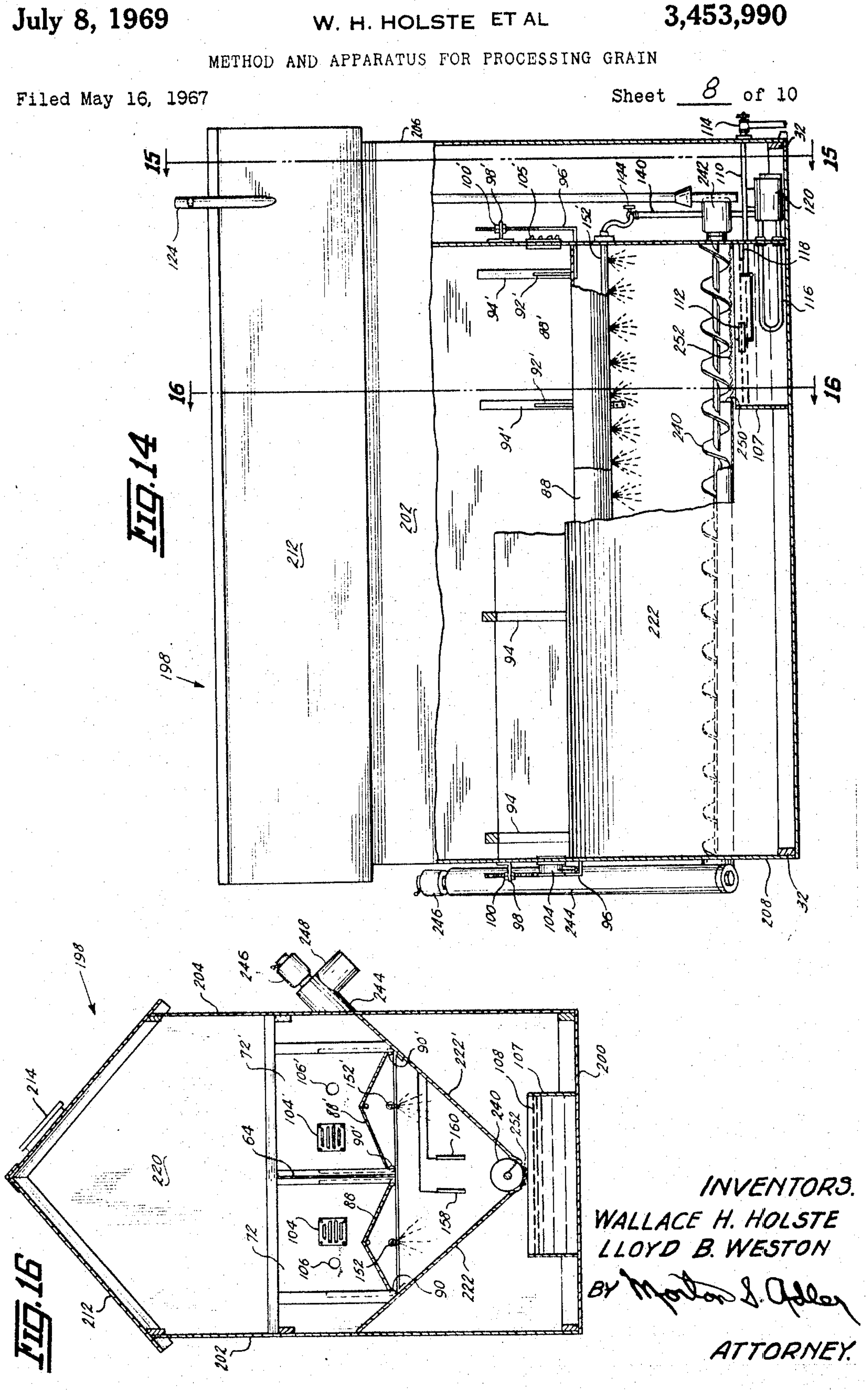
FIG. 14 is an enlarged side view of the unit shown in FIG. 13 with portions cut away to more fully illustrate the construction therein.
FIG. 16 is a cross section view taken on the line 16—16 of FIG. 14.

A second modified structure is shown in FIGS. 13–16 where the outer structure is similar to that in FIGS. 8–12 and like parts are given like numerals. Actually, this arrangement is merely a combination of those previously described where it will be seen that the V board structure of FIG. 4 is used to separate the storage area from the processing area and the conveyor means 240 in FIG. 9 is used to move the grain out of the processing area. The water system is the same as described for FIGS. 1–7 except for the elimination of the trough 58 and drinking compartment 126 and like numerals appear on like elements. In FIGS. 15 and 16 it will be noted that both the thermal and moisture sensing controls 158 and 160 as well as the time clocks control 254 for the water system are shown since both may be installed for use as desired.

Figure 19:
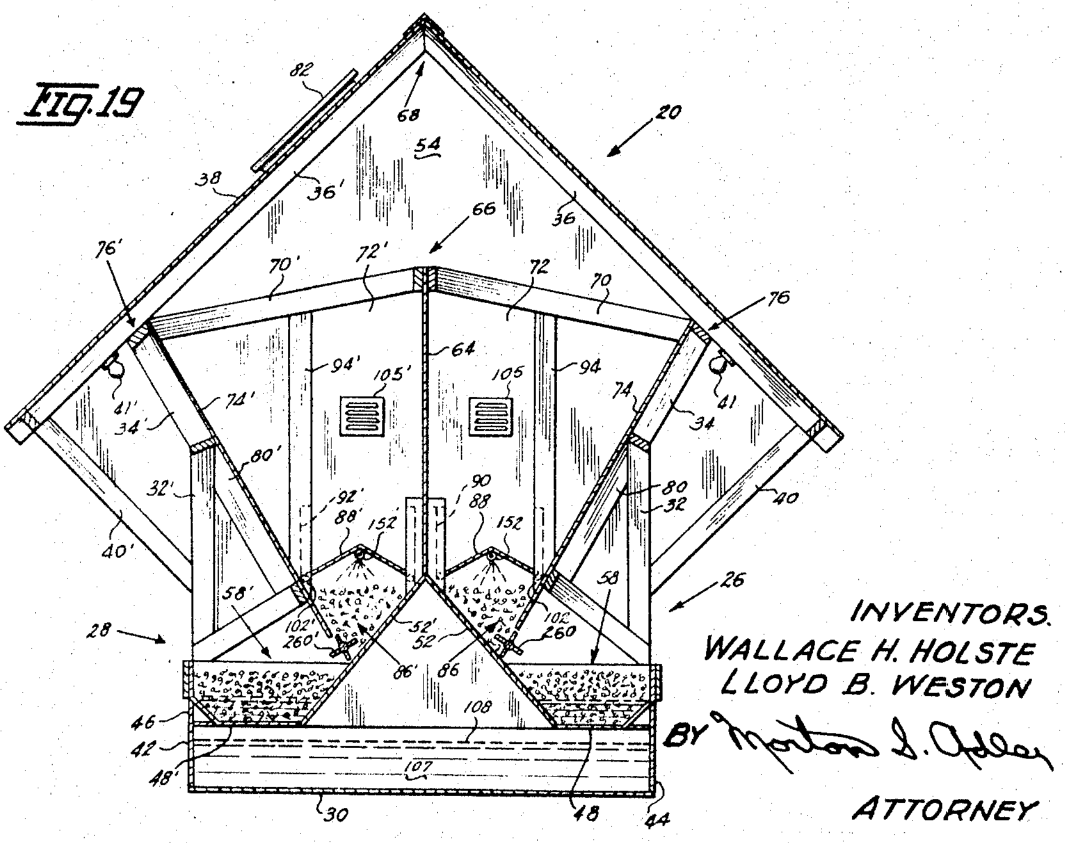
FIG. 19 is a cross sectional view taken on the line 19—19 of FIG. 18.

The third modification illustrated in FIGS. 18 and 19 embodies the same water distributing system as shown in FIGS. 1–7 and also the same building structure with the exception of the elimination of barrier 87 as seen in FIG. 4 and the substitution therefor of an elongated paddle wheel 260 disposed in passageway 86 with such passageway being narrower than shown in FIG. 4 by extending the bottom 78 of hopper side 74 closer to the deflector board 52 as best seen in FIG. 19. Wheel 260 is journalled between partition wall 54 and the rear wall 24 of house 20 and is operated by means of an adjustable speed motor 262 as seen in FIG. 18. Wheel 260 affords a positive feed control means which permits the feed to be supplied to the trough 58 at selected intervals. In this regard, the grain may be held within the processing chamber until the sprouts are of a desired length as wheel 260 serves also as a closure for passageway 86 when not in operation.

As pointed out earlier, the quality of the meat on animals fed with grain processed as disclosed herein has been vastly superior to that of animals fed on unsprouted grain and the time interval required to obtain this quality has been reduced approximately two-thirds over present feeding methods. It has also been observed that when this process is initially started with a supply of grain the germination period is of a longer duration and that germination appears to progressively increase as water that has passed through the grain is returned to tank 107 for re-heating and recirculation. While we are not prepared to explain the reason for this acceleration in germination by re-using the water as described, it would appear that such water absorbs an accumulation of unknown entities that are a part of the germination process which develops the full nutritional potential of the grain and the re-use of the water so affected materially increases the sprouting growth. It has also been observed that animals fed on this process obtain all of their drinking water from either trough 58 or compartment 126 and do not seek water elsewhere.

Also, for some reason not readily understood at this time, animals fed on the process described produce manure which has no objectional odor and also such animals appear to be bothered little, if at all, from flies and insects while other animals nearby on conventional feed had the usual accumulation of flies and manure odor.

The results indicated are believed to be directly related to the nutritional advantages of sprouted grain, and the process and apparatus described for inducing such sprouting has been demonstrated as a most efficient and economical way for accomplishing the objectives intended.

It is submitted that the invention shown and described is aptly suited to achieve the purposes intended and is characterized by a combination of highly useful and mutually cooperating elements that combine their respective and proportionate functions in accomplishing the objects sought to be obtained.

We claim:

1. Apparatus to germinate grain, comprising:

a grain processing house including a floor, wall sides and ends and a roof, an open top trough contiguous with the outer side of one side of said house and having a bottom planar with said floor, a foraminous partition in said trough dividing the same into a feed compartment and a drinking compartment, a feed hopper in said house having a gravity discharge passageway that communicates with said feed compartment, means in said hopper dividing the same into an upper feed storage area and a lower processing area with said processing area in communicaiton with said feed compartment through said passageway, a temperature sensing means in said processing area operatively connected to a pump means, said temperature sensing means being set for predetermined high and low limits, said temperature sensing means acting at said low limit to actuate said pump means for providing heated moisture from a reservoir to heat the grain in said processing area above said low limit, said temperature sensing means acting at said high limit to actuate said pump means to provide water from said reservoir to said processing area for cooling said grain below said high limit, means for regulating the flow of feed from said storage area into said processing area, means in said discharge passageway for regulating feed flow from said processing area into said feed compartment, a water reservoir in said house connected to a source of fresh water supply under ordinary main pressure, control means in said reservoir to maintain a water temperature within predetermined limits, water spray means in said processing area, pump means to deliver water from said reservoir to said water spray means at predetermined intervals, water passing through said feed in said processing area moving by gravity through said passageway into said feed compartment and through said partition into said drinking compartment, means in said drinking compartment to control the depth of water so that a portion of said discharge passageway remains exposed to the atmosphere for aeration into said processing area, and means to return excess water in said feed and drinking compartments to said reservoir for recirculation to said water spray means.

2. A device as defined in claim 1 including:

a filter in the top portion of said water reservoir, and a conduit from said water reservoir to said pump means and so disposed that water drawn from said water reservoir is taken from the top portion thereof after passing through said filter.

3. A device as defined in claim 1 wherein the fresh water intake into said water reservoir serves to agitate and admix the contents thereof with the water returned thereto from said processing area and feed and drinking compartments.

4. A device as defined in claim 1 including:

separate water flow communication means between said drinking compartment and said water reservoir, and float valve means in said drinking compartment operatively connected to said pump means to automatically actuate the same and provide water flow through said separate water flow communication means for maintaining a water level in said drinking trough at a predetermined point.

5. A device as defined in claim 1 including:
an overflow pipe in said drinking compartment connected to said water reservoir, and
temperature sensing means in said drinking compartment operatively connected to said pump means so that irrespective of the water level in said drinking compartment, heated water will be automatically drawn into said drinking compartment to maintain a desired water temperature therein and if heated water is required when said drinking compartment is full, the excess will return to said water reservoir through said overflow pipe.

6. A device as defined in claim 1 including means to aerate said processing area.

7. A device for sprouting grain comprising:
a walled enclosure having a cover,
means providing a grain storage hopper in said enclosure for unsprouted grain,
the bottom of said hopper defining a discharge end that is provided with a plurality of longitudinally spaced discharge openings,
means to selectively open and close said discharge openings,
an auger-type diffuser in said storage hopper below said discharge openings,
means defining a hopper shaped processing area in said enclosure below said storage hopper,
means to operate said diffuser to move grain from said storage hopper to said processing area at a predetermined rate of flow,
conveyor means in the bottom of said processing area to move grain to a point of deposit,
a water reservoir in said enclosure connected to a source of fresh water supply under ordinary main pressure,
control means in said reservoir to maintain a water temperature within predetermined limits,
water spray means in said processing area,
pump means to deliver water from said reservoir to said water spray means at predetermined intervals, and
water drainage means in the bottom of said processing area communicating with said water reservoir so that water passing through the grain in said processing area will be returned to said water reservoir.

8. A device as defined in claim 7 including:
a moisture sensing means in said processing area and set for predetermined limits, and
means operatively connecting said moisture sensing means to said pump means to automatically actuate the same for delivering water from said reservoir to said spray means in response to predetermined moisture requirements in the grain being processed.

9. A device as defined in claim 7 including:
a temperature sensing means in said processing area operatively connected to said pump means,
said temperature sensing means being set for predetermined high and low limits,
said temperature sensing means acting at said low limit to actuate said pump means for providing heated moisture from said reservoir to heat the grain in said processing area above said low limit, and
said temperature sensing means acting at said high limit to actuate said pump means to provide water from said reservoir to said processing area for cooling said grain below said high limit.

10. A device as defined in claim 7 including:
a filter in the top portion of said water reservoir, and
a conduit from said water reservoir to said pump means and so disposed that water drawn from said water reservoir is taken from the top portion thereof after passing through said filter.

11. A device as defined in claim 7 wherein the fresh water intake into said water reservoir serves to agitate and admix the contents thereof with the water returned thereto from said processing area and feed and drinking compartments.

12. A method for inducing the sprouting of grain which includes:
providing a source of control water supply maintained at a temperature within a predetermined range,
moving a supply of grain directly from a storage area into and through a processing area to a point of deposit,
determining the moisture content of the grain as it moves through said processing area and selectively moistening said grain from said water supply only in said processing area to maintain a predetermined moisture content,
determining a respective high and low temperature limit for the grain as it moves through said processing area and providing moisture to the grain in said area from said water supply to selectively raise the temperature of the grain when it goes below said low limit and to lower the temperature of said grain when it exceeds said high limit,
aerating the grain in said processing area, and
collecting the residue moisture near the point of deposit after it has permeated the grain and returning it to said water supply.

13. A method as defined in claim 12 which includes admixing and agitating the water supply with the returned residue moisture.

14. A method as defined in claim 12 which includes straining the water in said water supply at the upper portion of said supply and drawing the strained water therefrom for use in the processing area as described.

15. A method as defined in claim 12 wherein all moisture supplied to said processing area whether for heating or cooling of the grain is sprayed on the grain.

16. The grain product produced by the method of claim 12.

17. The grain product produced by the method of claim 13.

18. The grain product produced by the method of claim 14.

19. The grain product produced by the method of claim 15.

20. The product of the collected residue moisture after it has been returned to the water supply as produced by the method of claim 12.

21. The product of the collected residue moisture after it has been returned to the water supply as produced by the method of claim 13.

22. The product of the collected residue moisture after it has been returned to the water supply as produced by the method of claim 14.

23. The product of the collected residue moisture after it has been returned to the water supply as produced by the method of claim 15.

References Cited

UNITED STATES PATENTS

| | | | |
|---|---|---|---|
| 2,654,691 | 10/1953 | Frauenheim | 195—71 |
| 3,233,590 | 2/1966 | Venca | 119—51.5 |

HUGH R. CHAMBLEE, *Primary Examiner.*